Oct. 4, 1932.                    J. LUNDGREN                        1,881,205
                       APPARATUS FOR DETERMINING BALANCES
                       Filed June 29, 1928        4 Sheets-Sheet 1
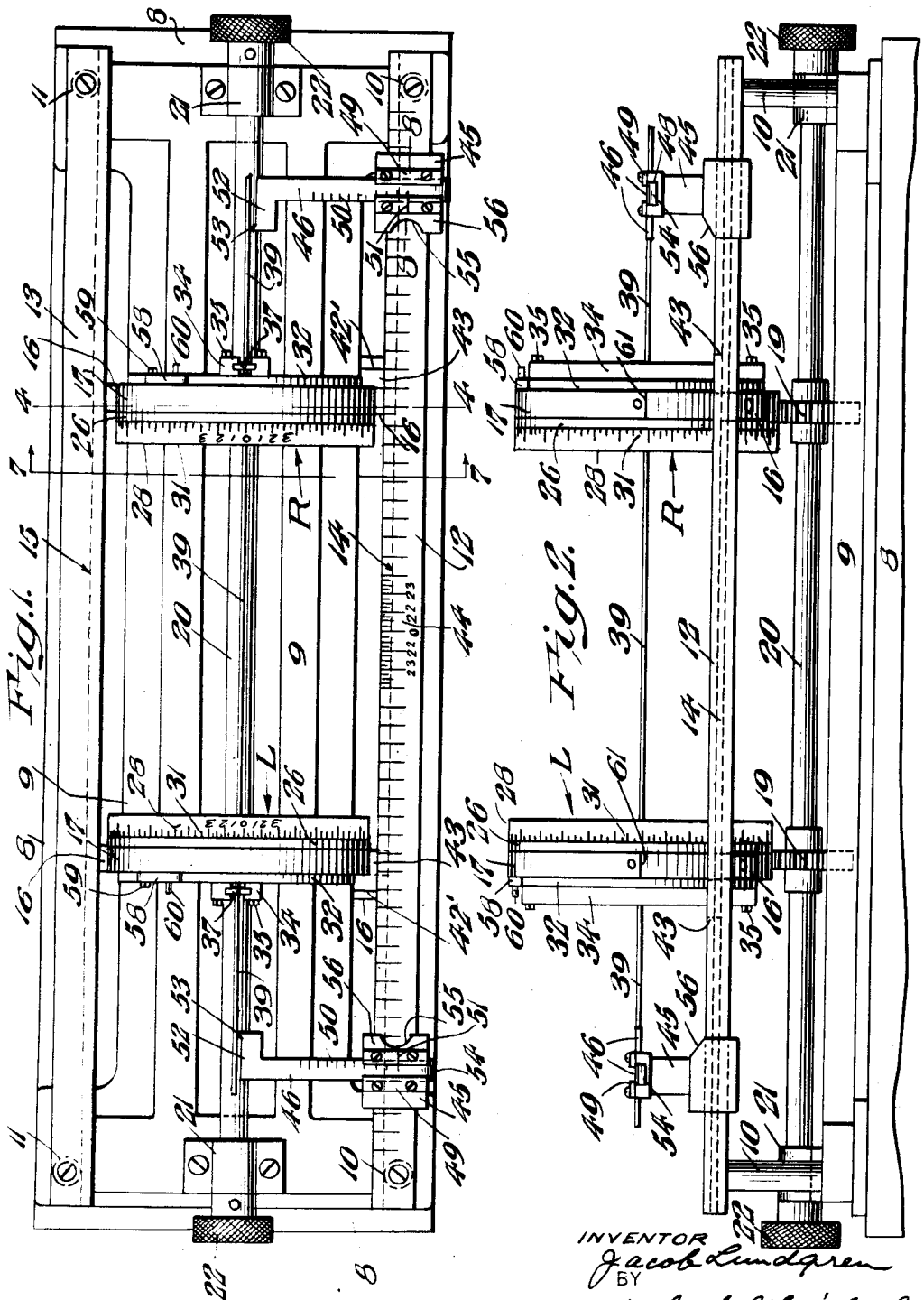
ATTORNEY.

Oct. 4, 1932.  J. LUNDGREN  1,881,205
APPARATUS FOR DETERMINING BALANCES
Filed June 29, 1928   4 Sheets-Sheet 2
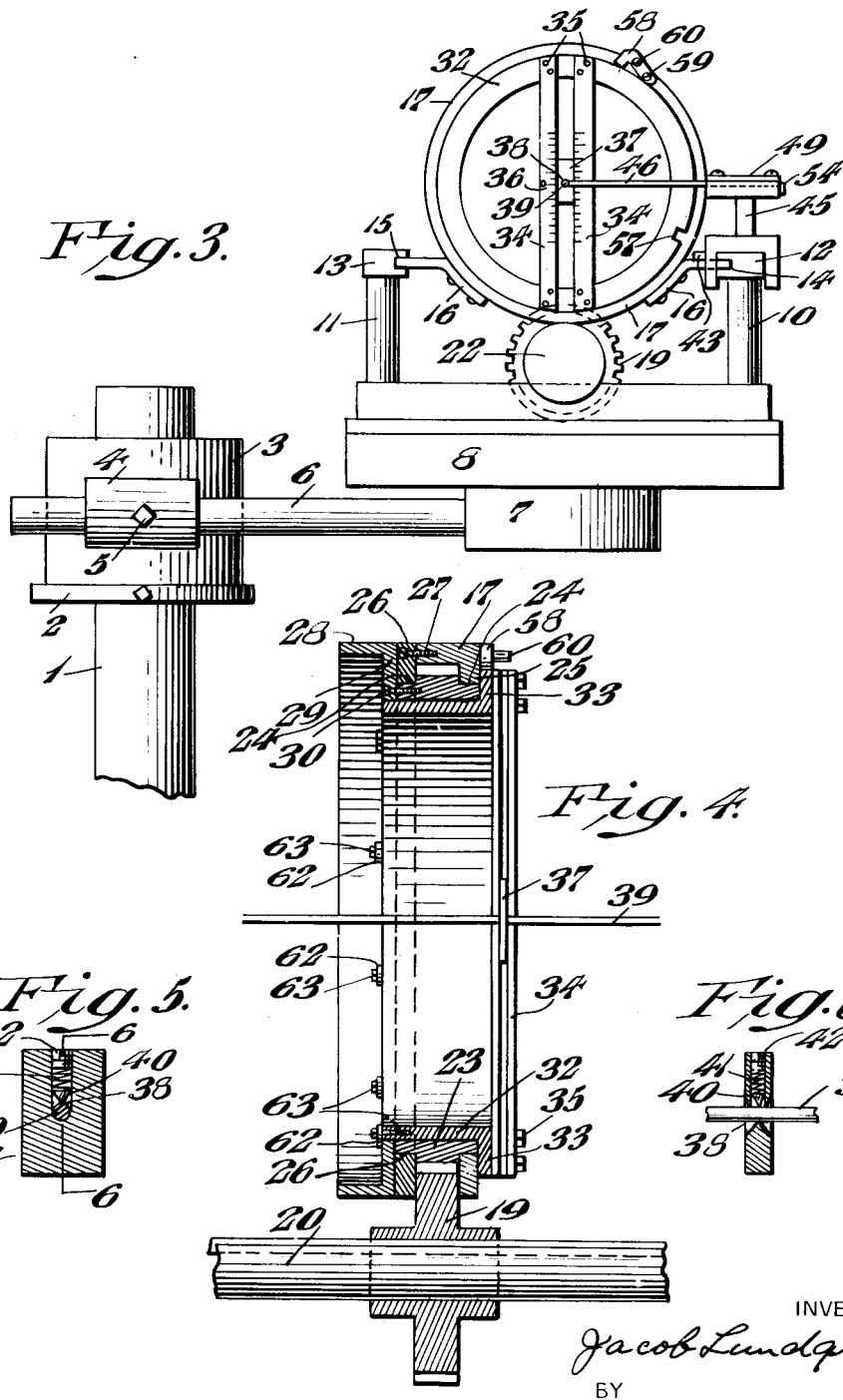

Oct. 4, 1932.  J. LUNDGREN  1,881,205
APPARATUS FOR DETERMINING BALANCES
Filed June 29, 1928  4 Sheets-Sheet 3
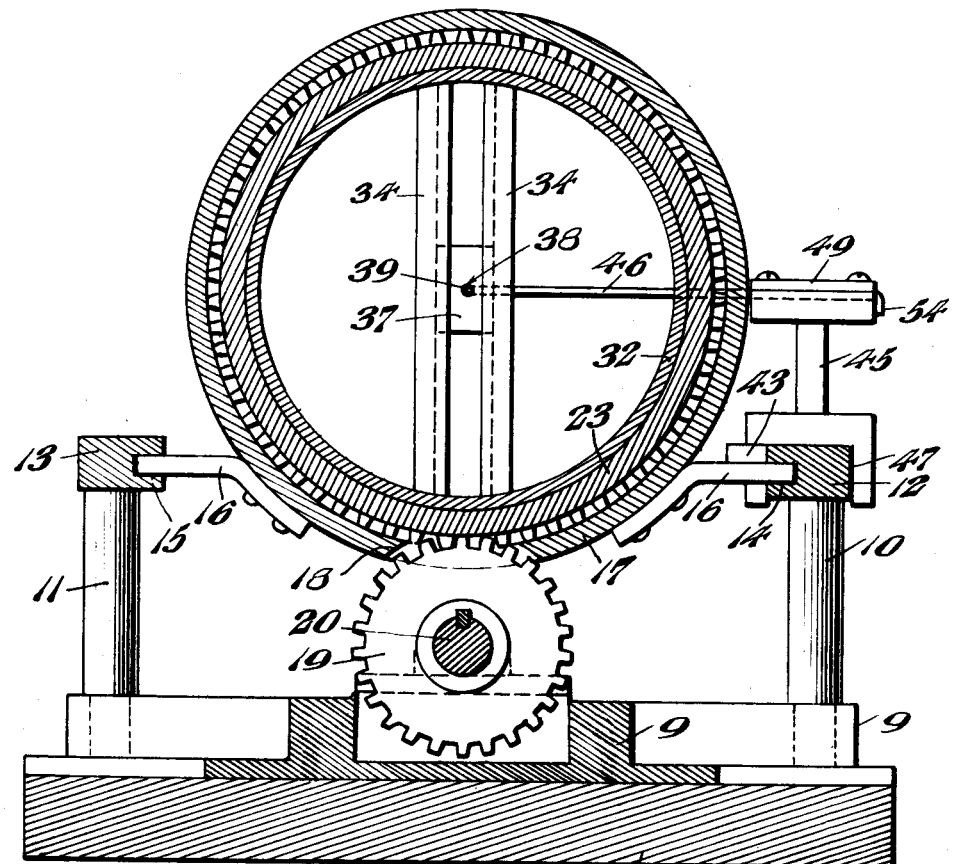
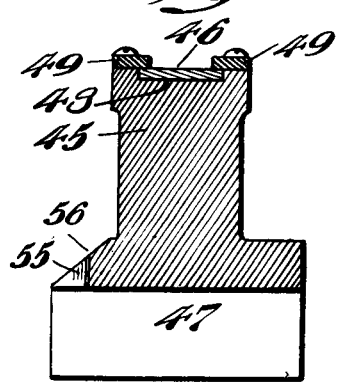
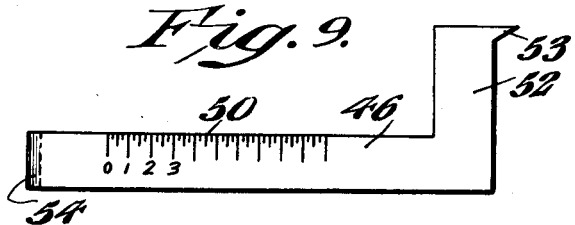
INVENTOR:
Jacob Lundgren
BY
Herbert S. Fairbanks
ATTORNEY.

Oct. 4, 1932.　　　　J. LUNDGREN　　　　1,881,205
APPARATUS FOR DETERMINING BALANCES
Filed June 29, 1928　　4 Sheets-Sheet 4
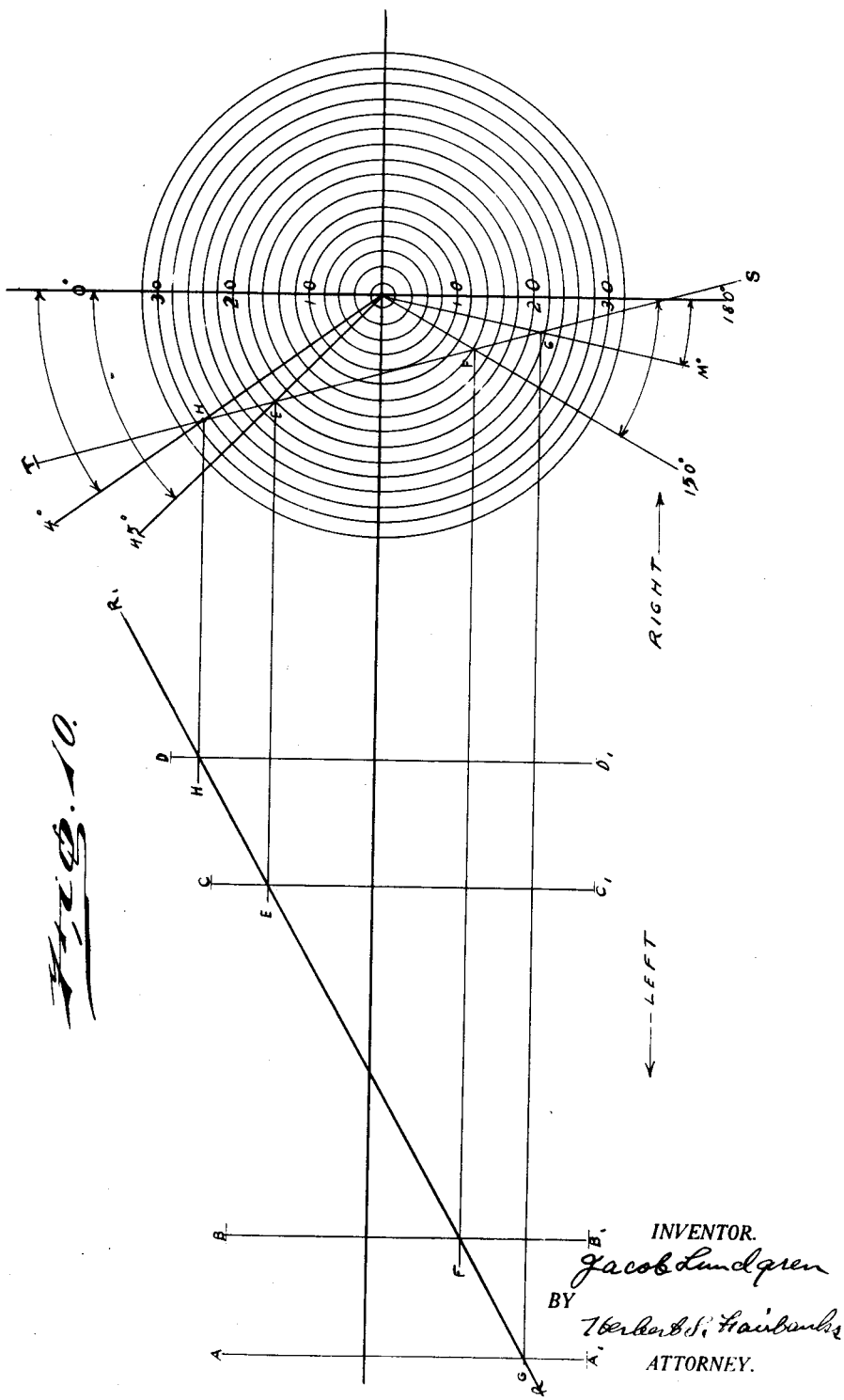

Patented Oct. 4, 1932

1,881,205

UNITED STATES PATENT OFFICE

JACOB LUNDGREN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA

APPARATUS FOR DETERMINING BALANCES

Application filed June 29, 1928. Serial No. 289,235.

In order to determine and correct the unbalance in a rotatable body, it is necessary to determine the angle of unbalance and its linear location. The specimens under test, in many cases, are of such a character that the correction cannot be made at the point at which the unbalance is determined, and it is therefore necessary to transfer the unbalance reading to a predetermined place or places along the axis of the specimen under test.

In the methods and constructions heretofore employed, it has been necessary to mathematically compute from the unbalanced readings a new angle or angles and the amount of correction at a predetermined point or points along the specimen at which the unbalanced correction can be most conveniently made without injury to the specimen. A calculation of this character cannot be made by the average workman, and even when made by an expert in this art, a considerable amount of time is necessary to determine the angle and the proper amount for correction of unbalance at the transfer points of the specimen.

With the above in view, the object of this invention is to devise a novel method of and apparatus for determining the proper angle or angles of correction and the amount of unbalance at a point or points along the axis of the specimen different from the points of support.

A further object of this invention is to devise novel transfer mechanism which can be employed by an unskilled person and which can be used in conjunction with any desired or conventional type of balancing machine, in order to determine the angle and amount of unbalance at the transfer points of correction of the specimen.

A further object of this invention is to devise a novel system and a novel method of calculating from previously obtained data the position and the amount of the force to be balanced.

A further object of the invention is to devise novel mechanism of the character herein set forth, which can be conveniently attached to, and, if desired, form a part of a balancing machine, so that the operator of the machine during the balancing operation can, not only determine the angle and linear location of the unbalance shown by the readings of the machine, but he can also determine and transfer the correct amount and angle of unbalance at any desired point along the axis of the specimen without removing the specimen from the balancing machine and without turning the specimen around in the balancing machine.

With the above and other objects in view, as will hereinafter be clearly set forth, my invention comprehends a novel method of and apparatus for calculating, from previously obtained unbalance readings of a specimen, the location and amount of the force to be balanced.

It further comprehends a novel method of and apparatus for calculating from previously obtained unbalance readings of a specimen the correction for unbalance in two selected planes along the axis of the specimen.

It further comprehends a novel construction and arrangement of angle indicators and novel means for mounting them so that they are rotatably and longitudinally adjustable, novel means for supporting an indicator, and novel means for carrying the indicator by such angle indicators and for independently adjusting its position with respect to each angle indicator to indicate in ounce inches the amount of unbalance corresponding to an unbalance reading as determined in a balancing machine for a specimen under test.

It further comprehends novel constructions and arrangements of scales and indicators to enable the determining of the correct unbalance at transfer points corresponding to selected points along the axis of the specimen, the unbalance of which is to be corrected.

Other novel features of construction and advantage will hereafter more clearly appear in the detailed description and the appended claims.

For the purpose of illustrating my invention, I have shown in the accompanying drawings a form thereof which is at present preferred by me, since it will give in practice satisfactory and reliable results, although it is to be understood that the various instrumentalities of which my invention consists can be variously arranged and organized and that my invention is not limited to the precise arrangement and organization of these instrumentalities as herein shown and described.

Figure 1 is a top plan view of a mechanism for calculating from previously obtained data the position and amount of the force to be balanced in the specimen and which can be advantageously employed in carrying out my novel method.

Figure 2 is a side elevation of the construction seen in Figure 1.

Figure 3 is an end elevation showing more particularly the manner in which the transfer mechanism is mounted.

Figure 4 is a section on line 4—4 of Figure 3.

Figure 5 is a transverse section on an indicator slide.

Figure 6 is a section on line 6—6 of Figure 5.

Figure 7 is a section on line 7—7 of Figure 1.

Figure 8 is a section on line 8—8 of Figure 1.

Figure 9 is a plan view of a transfer indicator.

Figure 10 is a diagram illustrating the theory of the invention.

Similar numerals of reference indicate corresponding parts.

Referring to the drawings:—

The transfer mechanism may be supported in any desired manner and may form, if desired, a part of a balancing machine of any desired or conventional type in which the readings for dynamic balance of a rotatable specimen can be determined.

In practice, the base of the balancing machine is adapted to support at its rear portion a standard 1, on which is adjustably mounted a set collar 2, above which is positioned a bracket 3 apertured to receive the standard 1. The bracket 3 is provided with a laterally extending apertured extension 4, in which is adjustably fixed by means of a set screw 5, a rod 6 which is connected to a bracket 7 fixed in any desired manner to the base plate 8 of the transfer mechanism. This base plate 8 carries the base proper 9 from which rise the front posts 10 and the rear posts 11, see more particularly Figures 2, 3 and 7.

The front posts 10 carry a front bar 12 and the rear posts 11 carry a rear bar 13. The front bar 12 is provided with a longitudinally extending slot 14, and the rear bar 13 is provided with a similar slot 15. These slots are adapted to receive the brackets 16 fixed to support rings 17, which are cut away at their lower portions, as at 18, in order to permit the gears 19 to extend therethrough.

These gears 19 are splined to an actuating shaft 20 journalled in bearings 21 and provided at its end with handles 22. The gears 19 mesh with the gears 23, which are provided on opposite sides of the gear teeth with the bearing faces 24. The support rings 17 are each provided at one side with an inwardly extending flange 25 engaging one of said bearing faces, and the gear 23 is retained in assembled position by means of a ring 26 secured to its support ring 17 by fastening devices 27 and overhanging the gear teeth of the gear and having a bearing on one of the bearing faces 24.

28 designates an angle indicator provided with an inwardly extending flange 29, which has a friction bearing against the ring 26, and which is fixed to the gear 23 by fastening devices 30. The outer periphery of the angle indicator 28 is graduated as at 31.

32 designates an unbalance carrier comprising an annular ring having a friction bearing with the inner periphery of the gear 23 and provided with an outwardly extending annular flange 33 which overhangs the flange 25 of the support ring 17.

34 designates slotted guides fixed to the unbalance carrier 32 by fastening devices 35 and provided with graduations 36. A shoe or indicator slide 37 is slidable in the guides 34 and apertured as at 38 to receive a rod 39. The aperture 38 is counter-sunk at opposite sides to provide an anti-friction bearing. A plunger 40 is pressed against the rod 39 by means of a spring 41, which abuts at its outer end against a stop 42. A graduation 42' on a block 43 fixed to a bracket 16 is in line with the center of a slide 37.

The front bar 12 is graduated on its top face as indicated at 44. The front bar carries the slides 45 in which the indicators 46 are laterally adjustable.

The slides are provided with the slots 47 and are recessed in their top face as at 48 to receive the indicators 46 which are retained in position by the guides 49. The indicators 46 are provided with graduations 50 adapted to register with a line 51 on a guide 49. The indicators 46 are preferably offset as at 52 and terminate in a pointed end 53, and at their rear end are deflected as at 54 to form a handle. The slides 45 have their inner side faces recessed as at 55 to facilitate their manipulation and the top face is tapered as at 56.

I provide means to lock the unbalance carrier 32 in a stationary position, and, as illustrated, the carrier is provided with a slot 57 in its periphery which is adapted to receive the free end of a latch 58 pivoted at 59 to a support ring 17 and provided with a handle 60.

The support rings 17 are provided with a zero mark 61 with which the graduations 31 on an angle indicator are brought into register to indicate the angle. The unbalance carriers 32 are secured in assembled position by washers 62 which overhang the angle indicators and are secured to the unbalance carriers by screws 63.

The graduations on the transfer indicators or scales 46 are the same as the graduations on the guides 34. The angle indicators, unbalance carriers, angle gears and their adjuncts are arranged in sets so that there is a set for each plane of correction of the specimen.

The operation is as follows:—

In the use of the instrument and in the carrying out of my novel method the units R and L including the angle indicators 28 are positioned at the points corresponding to the points of correction and the transfer slides 45 are positioned at the points corresponding to the points of support. It will be understood that the points of support are the points at which the specimen is supported and the points of correction are the points at which the reading is to be transferred to determine the requirements for corrections at such points of correction to place the specimen in balance. One of the unbalance carriers 32, for example the right hand one, is locked in zero position, at which time its guides and its unbalance slide are in a horizontal position. The angle indicator 28 at the right hand side of the machine is now turned to indicate the angle of unbalance as determined by the testing of the specimen in the balancing machine. The unbalance slide 37 is next adjusted in accordance with the ounce inches as determined by the testing of the specimen in the balancing machine. The unbalance carrier is now unlocked.

The unit L having the unbalance indicator 28 and slide 37 at the left is now set in a similar manner to that just described. The lock for the unbalance carrier 32, at the left of the transfer instrument, is now moved into its operative position, and the actuating shaft revolved to bring its unbalance carrier 32 into locking position and the free end of the latch 58 drops into the recess in the flange of the unbalance carrier. The angle indicator is adjusted to the angle as determined by the reading of the balancing machine, and the unbalance carrier is unlocked. The left unbalance slide is now adjusted in accordance with the amount or ounce inches of unbalance as determined by the testing of the specimen in the balancing machine.

The setting of the transfer instrument is now indicative of the unbalance readings of the specimen obtained from the testing of the specimen in the balancing machine.

The angle shaft is now turned to simultaneously revolve the angle indicators unbalance carriers and their adjuncts and each indicator slide 46 is laterally adjusted so that its pointer will just touch the indicator rod.

The amount or ounce inches to be transferred at the right hand end is read on the graduations of the right hand transfer slide, and the new angle is indicated on the right hand angle indicator. In a similar manner the new angle and amount are obtained for the other plane of correction. Thus the left transfer slide is laterally adjusted so that it will just touch the indicator rod when the actuating shaft is revolved and the ounce inches at the point or plane of correction are indicated by the graduations on the transfer slide. With the pointer of the transfer slide just touching the indicator rod 39 the new angle is read on the left hand angle indicator.

We have now obtained the angles and amounts to be used at the points or planes of corrections to place the specimen in balance.

The unbalance slides can be adjusted at any time but the angle indicators must be adjusted one at a time.

Either of the transfer slides or scales 46 may be adjusted for a point of support located between the selected points of correction and both of such transfer scales can be adjusted for points of support located between the selected points or planes of correction. In such case the calculations will be determined in the same manner as explained herein.

The distance between a point of support and a point of correction at one end of the transfer instrument is preferably the same as the distance between the point of support and the point of correction at the other end of the instrument. Let us assume a problem in which the unbalance at the right hand end of the specimen is 20 ounce inches, plane direction 45°; and the unbalance at the left hand end of the specimen is 12 ounce inches, plane direction 150°. Referring to Figure 10, plane D—D is the plane where the reading of unbalance at the right end was taken in the balancing machine. The plane A—A, is where the left end reading was taken. Planes B—B, and C—C, are the planes to which the readings are to be transferred. The distance between the planes of reading and planes of correction are the same, or as nearly so as possible. This is accomplished by setting the supports in the balancing machine at each end equal distances from the planes of correction.

The distances between planes of support and planes of corrections do not necessarily have to be in the exact linear distance as indicated in the balancing machine but must be in the same relative proportion. Set the angle indicators 28 in their respective planes, B—B, and C—C, by moving the units R and L so that their respective indexes 42′ are opposite the particular graduation on the scale 12 which corresponds to the position of planes C—C and B—B set the slides 45 carrying the indicator plates 46 to the particular graduation on the scale 12 corresponding to planes A—A, and D—D. Drop the locking pawl 58 at one end, say the right end for instance, and turn the knob 22 until it drops down in slot 57. Continue to turn knob 22 until the graduation on ring 28 indicates 45° which was phase direction of the right end reading. Move the slide plate 37 carrying rod 39 to 20 ounce inches which was the amount of unbalance reading at right end. Lift the pawl 58 out of slot 57 thereby causing the slide 36 with ring 32 and 28 to move as a unit when revolved by means of knob 22 and shaft actuating gear 19. Set the left end now in the same manner while pawl 58 is out if engagement with slot 57 at right end. The left end setting is as per above example 12 ounce inches at 150°. When now turning the knob 22 with the pawls 57 out of engagement at both ends, the points E and F on the diagrams will remain at the same relative position or have the relative angular position.

The rod 39 represented on the diagram by line R—R, passes through the points of indicated unbalance at the plane of correction instead of plane of support for the reason that a dynamic couple increases with the decrease of distance between plane of correction or vice versa. By turning the hand knob 22 both the units right and left end will revolve in a fixed relative position held this way by friction devices. If the slide 46 is pushed forward to a position that its point 53 merely touches the rod 39 when it passes this point at each end, the transferred unbalance is read off on scale 50 at each end.

The phase or angular direction of the transferred unbalance is read off in degrees on the angular graduation 31. The angle indicated opposite the "0" mark line 61 just when the rod 39 touches the point 53 is the angle for the transferred value. It is important that both ends should be adjusted to the unbalance reading in setting the transfer instrument before any attempt is made to read the transferred amount.

The diagram also clearly indicates the basic principle of the transfer instrument. After setting of the instrument to the example mentioned previously and indicated on the diagram, the transferred unbalanced points must lay on the line R—R, which represents the rod 39. It is also apparent that the transfer points then must lay on the line S—T, which is an end view of line R—R. The projected points H and G on the circular view on diagram will then represent the transferred amounts of E at 45° and F at 150° or equal to H at 4° and G at M°.

In accordance with this invention I first produce a setting which indicates the angle, amount and linear location of unbalance of a tested specimen at two fixed points and from this determine the angle, amount and linear location of the unbalance at two selected points of correction which will have the same counter-balancing effect on the specimen as is obtained by the angle, amount and linear location of the unbalance determined in a balancing machine and indicated at said two fixed points.

It will be apparent that in carrying out my novel method, I adjust an unbalance indicator to a position indicative of the dynamic unbalance of a specimen at two fixed points. I then bodily rotate the indicator and determine from the position of the indicator, the angle and amount of unbalance at two selected points of correction.

The unbalance indicator is bodily revolved relatively to a fixed line and the angles of unbalance are computed at selected points of correction in accordance with the position of the angle indicators, and amount of unbalance at selected points of correction is computed by measuring the distance between the unbalance indicator and the selected points.

It will now be apparent that I have devised a new and useful method of and apparatus for calculating from unbalance readings the proper angle and amount of unbalance of a specimen to be transferred to selected planes of correction which embodies the features of advantage enumerated as desirable in the statement of the invention and the above description, and while I have, in the present instance, shown and described a preferred embodiment thereof which will give in practice satisfactory and reliable results, it is to be understood that this embodiment is susceptible of modification in various particulars without departing from the spirit or scope of the invention or sacrificing any of its advantages.

Having thus described my invention what I claim as new and desire to secure by Letters Patent, is:—

1. In a transfer instrument, means to indicate the angle, amount and linear location of unbalance of a tested specimen at two fixed points, and means to determine therefrom and indicate the angle, amount and linear location of the unbalance at two selected points of correction which will have the same counter-balancing effect on the specimen as the unbalance at said two fixed points.

2. In a transfer instrument, angle indicators longitudinally adjustable to points indicative of points of correction of the specimen and rotatably adjustable to positions indicative of angles of unbalance derived from tests of the specimen, an unbalance indicator carried by and radially adjustable relatively to said angle indicators, and transfer indicators longitudinally adjustable to points indicative of points of support of the specimen, and adjustable relatively to said unbalance indicator.

3. In a transfer instrument, an angle indicator and an amount indicator assembled as a unit adjustable to a position indicative of a plane of correction of the specimen, a second angle indicator and a second amount indicator assembled as a unit adjustable to a position indicative of a second plane of correction of the specimen, said angle indicator and amount indicator of a unit being normally revoluble together, means to lock the amount indicator against rotation during rotation of its angle indicator for the angle of unbalance, an unbalance indicator carried by said amount indicators and adjustable therewith, means to revolve said units and thereby said unbalance indicator, and amount determining means for the selected planes of corrections adjustable to contact with said unbalance indicator.

4. In a transfer instrument, an angle indicator and an amount indicator assembled as a unit adjustable to a position indicative of a plane of correction of the specimen, a second angle indicator and a second amount indicator assembled as a unit adjustable to a position indicative of a second plane of correction of the specimen, said angle indicator and amount indicator of a unit being normally revoluble together, means to lock the amount indicator for the angle of unbalance, an unbalance indicator carried by said amount indicators and adjustable therewith, means to revolve said units and thereby said unbalance indicator, and amount determining means for the selected planes of corrections adjustable to contact with said unbalance indicator, and the new angles for the planes of correction being indicated on said angle indicators when said unbalance determining means contacts with said unbalance indicator.

5. In a transfer instrument, angle indicators and unbalance carriers rotatably mounted and adjustable to points indicative of points of correction, means to lock the unbalance carriers against rotation, said angle indicators being individually adjustable by rotation, when the unbalance carriers are locked, to the angles determined by tests of the specimen, unbalance slides on said unbalance carriers and adjustable to indicate the amount of unbalance obtained from tests of the specimen, and indicator carried by said unbalance slides, and transfer indicators adjustable to points indicative of points of support of the specimen and adjustable relatively to the indicator carried by said unbalance slides to indicate the amounts of unbalance at the points of correction.

6. In a transfer instrument, angle indicators and unbalance carriers rotatably mounted and adjustable to points indicative of points of correction, means to lock the unbalance carriers against rotation, said angle indicators being individually adjustable by rotation, when the unbalance carriers are locked, to the angles determined by tests of the specimen, unbalance slides on said unbalance carriers and adjustable to indicate the amount of unbalance obtained from tests of the specimen, an indicator carried by said unbalance slides, and transfer indicators adjustable to points indicative of points of support of the specimen and adjustable relatively to the indicator carried by said unbalance slides to indicate the amounts of unbalance at the points of correction, and the angles of correction being indicated by the positions of the angle indicators when the transfer indicators touch the indicator carried by said slides.

7. In a transfer instrument, angle indicators and unbalance carriers rotatably mounted and adjustable to points indicative of points of correction, means to lock the unbalance carriers against rotation, said angle indicators being individually adjustable by rotation, when the unbalance carriers are locked, to the angles determined by tests of the specimen, unbalance slides on said unbalance carriers and adjustable to indicate the amount of unbalance obtained from tests of the specimen, an indicator carried by said unbalance slides, transfer indicators adjustable to points indicative of points of support of the specimen and adjustable relatively to the indicator carried by said unbalance slides to indicate the amounts of unbalance at the points of correction, and means to simultaneously rotate said angle indicators and said unbalance carriers.

8. In a transfer instrument, angle indicators and unbalance carriers rotatably mounted and adjustable to points indicative of points of correction, means to lock the unbalance carriers against rotation, said angle indicators being individually adjustable by rotation, when the unbalance carriers are locked, to the angles determined by tests of the specimen, unbalance slides on said unbalance carriers and adjustable to indicate the amount of unbalance obtained from tests of the specimen, an indicator carried by said unbalance slides, transfer indicators adjustable to points indicative of points of support of the specimen and adjustable relatively to the indicator carried by said unbalance slides to indicate the amounts of unbalance at the points of correction, and an actuating shaft intergeared with said angle indicators.

9. In a transfer instrument, angle indicators and unbalance carriers rotatably mounted and adjustable to points indicative of points of correction, means to lock the unbalance carriers against rotation, said angle indicators being individually adjustable by rotation, when the unbalance carriers are locked, to the angles determined by tests of the specimen, unbalance slides on said unbalance carriers and adjustable to indicate the amount of unbalance obtained from tests of the specimen, an indicator carried by said unbalance slides, transfer indicators adjustable to points indicative of points of support of the specimen and adjustable relatively to the indicator carried by said unbalance slides to indicate the amounts of unbalance at the points of correction, and means to retain an unbalance carrier in frictional relation with its angle indicator.

10. In a transfer instrument, a graduated bar, supports adjustable longitudinally of said bar, gears rotatably carried by said supports, angle indicators driven by said gears, unbalance carriers rotatably mounted in frictional relation with said gears and angle indicators, an indicator rod carried by and radially adjustable with respect to said unbalance carriers, and transfer indicators adjustable relatively to said indicator rod, and longitudinally adjustable to each other along said bar.

11. In a transfer instrument, a base, a shaft rotatable thereon, spaced bars carried by said base, one of said bars having graduations, supports slidable on said bars, an angle indicator mounted on each support and intergeared with said shaft, an unbalance carrier mounted on each support and rotatably adjustable with respect to its angle indicator, an indicator rod mounted in said unbalance carriers and radially adjustable thereon, transfer slides longitudinally adjustable on said graduated bar, and transfer scales adjustable on said transfer slides.

12. In a transfer instrument, a base, a shaft rotatably carried thereby, bars supported on said base, one of which is graduated, transfer slides adjustable on said graduated bar, graduated transfer members laterally slidable on said transfer slides, supports longitudinally adjustable along said bars, an angle indicator mounted on each support and intergeared with said shaft, an unbalance carrier mounted on each support and capable of relative rotatable adjustment with its angle indicator, guides on said unbalance carrier, one of such guides having graduations corresponding to the graduations on said transfer members, shoes for said guides, and an indicator rod carried by said shoes.

13. In a transfer instrument, a base, a shaft rotatably mounted on said base, bars carried by said base, one of said bars having graduations, transfer slides on said graduated bars, graduated transfer members adjustable on said transfer slides, supports slidable on said bars, an angle indicator rotatably carried by its support, an unbalance carrier rotatably carried by its support, a shoe radially adjustable on each unbalance carrier and having an aperture therethrough, the walls of which form an anti-friction bearing, an indicator rod passing through said apertures, and a spring pressed plunger carried by each shoe and engaging said indicator rod.

14. In a transfer instrument, a base, a shaft rotatably mounted on said base, bars carried by said base, one of said bars having graduations, transfer slides on said graduated bars, graduated transfer members adjustable on said transfer slides, supports slidable on said bars, an angle indicator rotatably carried by its support, an unbalance carrier rotatably carried by its support, means to prevent relative rotation of an angle indicator and its unbalance carrier, a shoe radially adjustable on each unbalance carrier and having an aperture therethrough, the walls of which form an anti-friction bearing, an indicator rod passing through said apertures, and a spring pressed plunger carried by each shoe and engaging said indicator rod.

JACOB LUNDGREN.